US006520710B2

United States Patent
Wells

(10) Patent No.: US 6,520,710 B2
(45) Date of Patent: Feb. 18, 2003

(54) POWDERED METAL ASSEMBLIES WITH FASTENER INSERTS

(75) Inventor: Allan Richard Wells, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 50 days.

(21) Appl. No.: 09/783,714

(22) Filed: Feb. 14, 2001

(65) Prior Publication Data

US 2002/0110414 A1 Aug. 15, 2002

(51) Int. Cl.[7] .............................. F16D 1/00; F16B 7/04
(52) U.S. Cl. ...................... 403/344; 403/373; 403/338; 403/381; 285/420
(58) Field of Search ................................ 403/331, 335, 403/338, 340, 344, 373, 374.3, 381; 285/364, 367, 405, 406, 415, 420

(56) References Cited

U.S. PATENT DOCUMENTS

| | | | | |
|---|---|---|---|---|
| 1,970,078 A | * | 8/1934 | Dillon | 285/112 |
| 4,189,810 A | * | 2/1980 | Beziat | 24/483 |
| 4,373,235 A | * | 2/1983 | Korgaonkar | 24/282 |
| 4,558,605 A | * | 12/1985 | Tanner | 403/344 |
| 4,783,029 A | * | 11/1988 | Geppert et al. | 24/459 |
| 4,902,046 A | * | 2/1990 | Maloberti | 285/34 |
| 5,580,184 A | * | 12/1996 | Riccitelli | 280/779 |
| 5,873,611 A | * | 2/1999 | Munley et al. | 24/20 W |
| 5,893,588 A | * | 4/1999 | Esser | 285/405 |
| 5,941,653 A | * | 8/1999 | Cipriani | 403/338 |
| 6,019,076 A |   | 2/2000 | Pierik et al. | |
| 6,155,743 A | * | 12/2000 | Chen | 248/161 |

FOREIGN PATENT DOCUMENTS

| | | |
|---|---|---|
| GB | 573441 | 11/1945 |
| GB | 825329 | 12/1959 |

* cited by examiner

Primary Examiner—Lynne H. Browne
Assistant Examiner—Jori R. Schiffman
(74) Attorney, Agent, or Firm—Patrick M. Griffin

(57) ABSTRACT

An embodiment of a component assembly for use in a mechanism includes a first member having a pair of spaced flanges with fastener receiving openings through the flanges. A second member is a hardened powdered metal part including spaced seats engaging the flanges and slots in the seats connecting with enlarged recesses. The slots and recesses have openings extending through sides of the second member. Inserts extending into the recesses through the openings have fastener engaging openings aligned with the fastener receiving openings in the flanges of the first member. Fasteners extend through the flanges and the slots to the insert openings, fixing the flanges of the first member to the seats of the second member. Exemplary assemblies are illustrated. The assemblies provide hardened wearing surfaces made from powdered metal with manufacture simplified by the fastener inserts received in openings formed parallel to the other major surfaces of the powdered metal components.

10 Claims, 3 Drawing Sheets

POWDERED METAL ASSEMBLIES WITH FASTENER INSERTS

TECHNICAL FIELD

This invention relates to component assemblies including simplified hardened powdered metal components.

BACKGROUND OF THE INVENTION

It is known in the art that powdered metal (PM) components may be made with high dimensional accuracy which provides hardened components that require little or no further finishing. However, to reach this result without excessive cost, the component design must be producible by opposing dies with punches aligned in the direction of die motion. Thus, a hardened cam or lever, for example, may be formed with a negative cam curvature that is difficult to produce without special grinding equipment or with non round openings or slots that would require special machining processes.

In design of component assemblies such as an oscillating cam and lever or a pivoting timing lever for a variable valve timing mechanism, the ability to use hardened PM parts was desired to avoid the cost of multiple machining processes in forming the components and to provide for variations in cam shape not easily produced by grinding. However, these assemblies included components held together by threaded fasteners received in openings extending normal to the direction of required PM punch motion so that the fastener openings would have to be machined in after the forming of the components. This would require making the PM components with lower hardness which would allow subsequent machining and would require hardening which could result in dimensional distortion. A workable solution was desired.

SUMMARY OF THE INVENTION

The present invention provides a solution in modification of the PM component to provide slotted recesses that extend from a side in the direction of die punch motion through fastener receiving seats that are engaged by flanges of a second component. The recesses receive inserts installed from the side and having threaded openings that align with openings in the mating flanges to receive fasteners for holding the components of the assemblies together.

The assembly designs allow the wearing components to be made of powdered metal, which is hardened at the time of sintering, with wearing surfaces ready for use with little or no further machining. The inserts may be made by any suitable processes and machined and hardened as necessary. Where dual inserts are used, they may be provided with heads and inserted from opposite sides of the assemblies to prevent relative lateral shifting of the components after assembly.

These and other features and advantages of the invention will be more fully understood from the following description of certain specific embodiments of the invention taken together with the accompanying drawings.

DESCRIPTION OF THE PREFERRED EMBODIMENT

Figure 1:
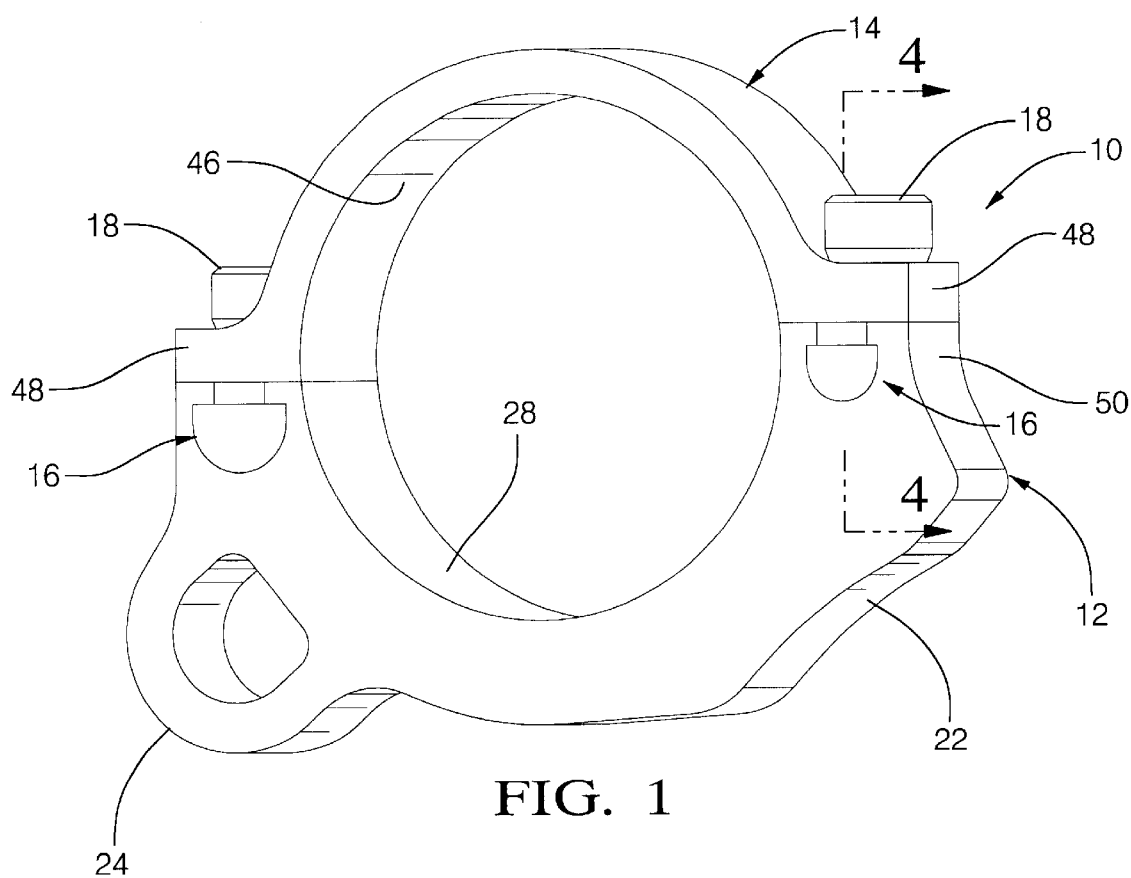
FIG. 1 is a pictorial view of an oscillating output cam assembly according to the invention

Referring now to the drawings in detail, numeral 10 generally indicates an oscillating output cam assembly formed according to the invention for use in an engine variable valve timing mechanism. Cam assembly 10 includes a cam component 12, a retainer component 14, a pair of fastener inserts 16 and a pair of fastener screws 18.

Figure 2:
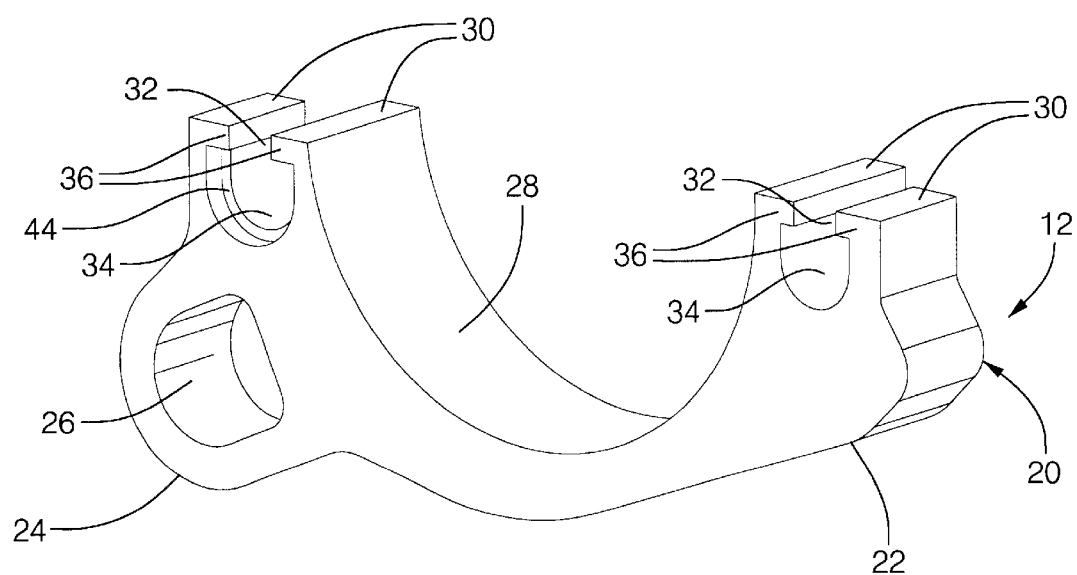
FIG. 2 is a pictorial view of the powdered metal (PM) cam portion of the assembly of FIG. 1.

The cam component 12, shown in FIG. 2, is formed by compaction of powdered metal (PM) and sintered to provide a hardened and finished component ready for integration in the assembly 10. While the PM process provides an accurate and acceptable cam surface for many applications, it is possible to further machine the cam and other surfaces by grinding if desired.

As shown, component 12 includes an arched body 20 having a variably curved cam surface 22 along an outer side with a lever boss 24 adjacent one end. A D-shaped opening 26 through the boss provides for connection to an associated linkage, not shown. Internally, a semi-cylindrical inner bearing surface 28 connects at opposite ends with coplanar seats 30. Each of the seats is divided by a slot 32, extending parallel to the bearing surface 28. An enlarged through opening or recess 34 connected with the slot 32 extends through the body spaced slightly from the respective seat 30 to form inwardly projecting lips 36. Each recess 34 may be of any suitable shape, but semicircular openings with a flat side toward the slot are preferred at present as resulting in lower stresses.

Figure 3:
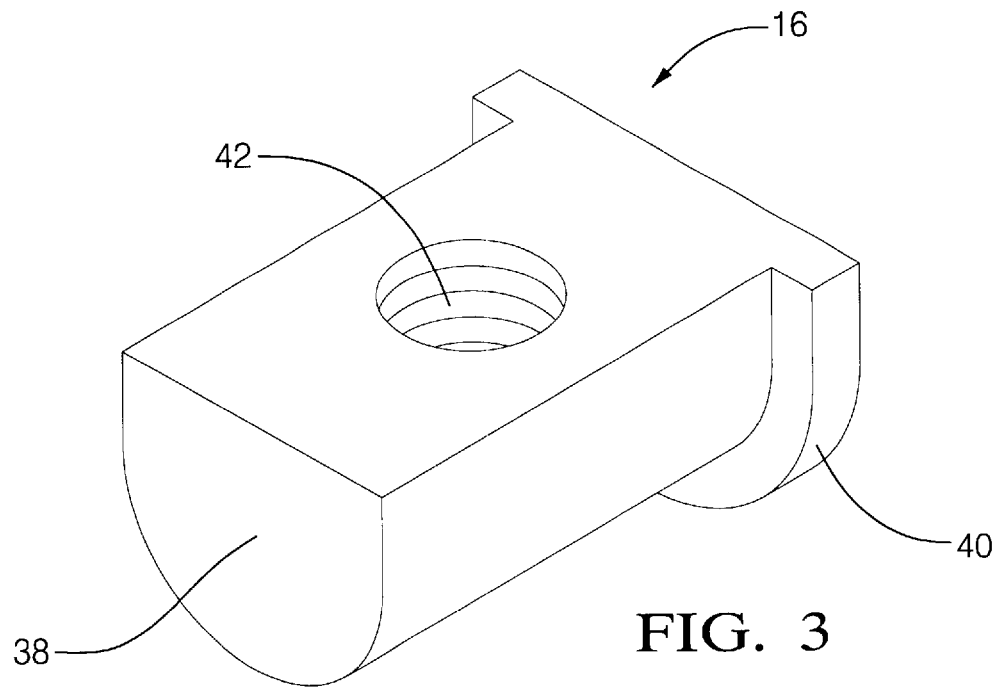
FIG. 3 is a pictorial view of one of the fastener inserts.

The fastener inserts 16 in FIG. 3 are shaped to fit into the recesses 34, thus having as shown D-shaped bodies 38, each with a small shoulder 40 preferably provided at one end. A threaded fastener engaging opening 42 extends into the body from the flat side of each body 38. The inserts 16 are insertable into the recesses 34 with their openings 42 facing the slots 32 on the seat sides of the recesses. The shoulders 40 may be received in mating grooves 44 at the edges of the body recesses 34. Preferably, the heads of the two inserts 16 are disposed at opposite sides of the bodies 20 for reasons to be subsequently made clear.

The retainer component 14 of the cam assembly 10 of FIG. 1 may be a cast and machined or otherwise formed member formed with an arch shape defining internally a semi-circular bearing surface 46. At the ends of the arch, are formed outwardly protruding flanges 48 with coplanar seat engaging surfaces 50 seated in assembly against the seats 30 of the cam body 20. Each flange has a fastener receiving opening 52 aligned with the slots 32 and the openings 42 in the inserts 16. The fastener screws 18 are received in these openings 52, 42 and cooperate with the inserts 16 to hold the cam component 12 and the retainer component together in the assembly 10.

Figure 4:
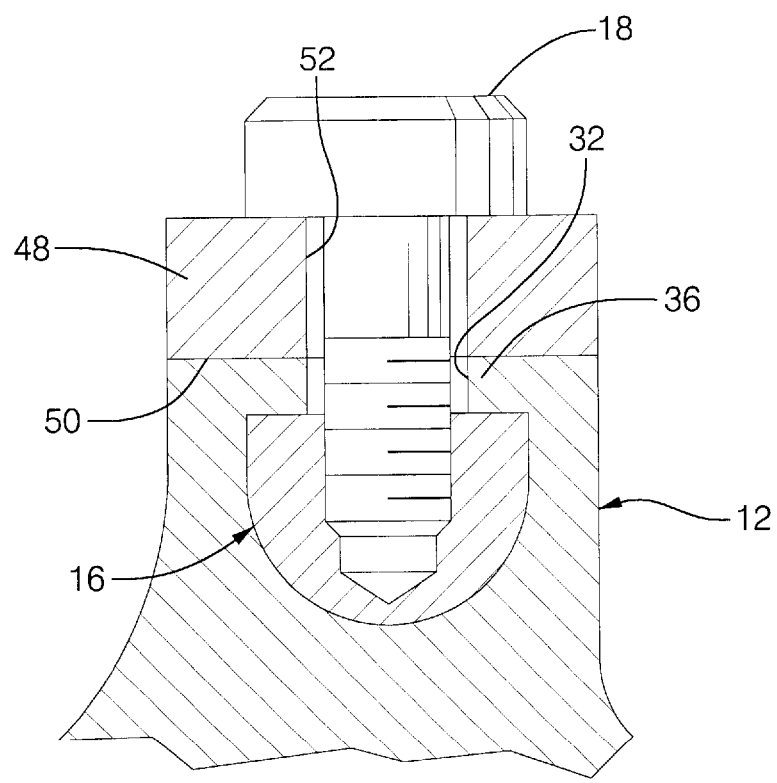
FIG. 4 is an enlarged cross-sectional view through the interface of the fastener and insert holding together the cam and retainer components of the assembly.

In assembly 10, as shown in FIGS. 1 and 4, the bearing surfaces 28, 46 join to provide a circular bearing opening in an annular mounting portion 12, 14 for supporting the oscillating cam assembly 10 on a rotating shaft in a mechanism, not shown. The fastener screws 18 engage the threaded openings 42 and the inserts 16 engage the lips 36 to fix the retainer and cam components together. The shoulders 40 of the inserts, acting against opposite sides of the cam body 12, provide additional assurance against separation of the assembly members by preventing the inserts from sliding in either direction in their recesses 34.

Figure 5:
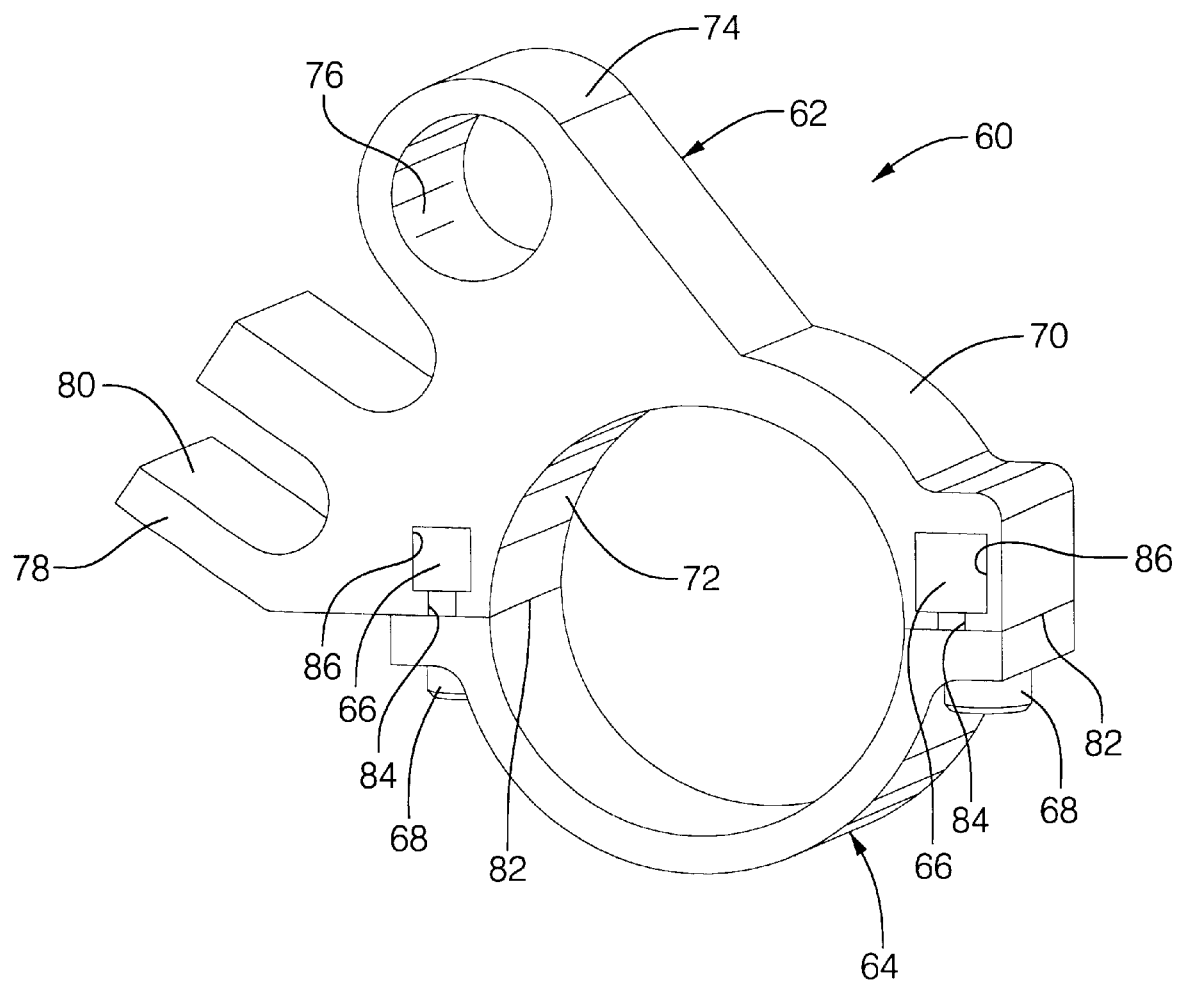
FIG. 5 is a pictorial view of an alternative application of the invention in a control lever assembly.

Referring now to FIG. 5, a control lever assembly 60 is shown which is an alternative embodiment of component assembly made in accordance with the invention. Assembly 60 includes a lever portion 62, retainer portion 64, inserts 66 and fastener screws 68. The retainer portion 64 and screws 68 are essentially identical to components 14, 18 previously described so that further description is unnecessary. The lever portion 62 is formed from hardened powdered metal (PM) as is the cam component 12 of the assembly 10. Lever portion 62 includes an arched body 70 with a semi-cylindrical bearing surface 72, which adjoins the bearing surface of the retainer portion 64 to form an annular mounting portion and bearing as before.

Lever portion 62 further includes a boss 74 with pin opening 76 and a driving fork 78 forming a slot 80 for receiving a pin of an associated control lever, not shown. The PM material provides good wear qualities for the slot 80, pin opening 76 and the bearing surface 72. Portion 62 also includes seats 82 for engaging flanges of the retainer portion 64. Slots 84 and through recesses 86 are also provided in the seats 82 to receive the inserts 66. However, the recesses 86 and inserts 66 have square cross sections instead of D-shaped ones as alternatives to the embodiment of FIG. 1.

As the novel features of control lever assembly 60 are similar to those of cam assembly 10 and the advantages are essentially the same, further explanation appears unnecessary.

While the invention has been described by reference to a preferred embodiment, it should be understood that numerous changes could be made within the spirit and scope of the invention described. Accordingly, it is intended that the invention not be limited to the disclosed embodiments, but that it have the full scope permitted only by the language of the following claims.

What is claimed is:

1. A component assembly for use in a mechanism, the assembly comprising:
    a first member including a flange with a fastener receiving opening through the flange;
    a second member comprised of a sintered and hardened powdered metal material, the second member including a seat engaging the flange, a slot in the seat and connecting with an enlarged recess spaced from the seat, the slot and recess extending parallel to the seat and forming an opening extending through a side of the second member adjacent the seat;
    an insert extending into the recess through the opening in the side of the second member, the insert having a fastener engaging opening in one side and aligned with the fastener receiving opening in the flange of the first member; and
    a fastener extending through the flange and the slot and engaging the insert opening, thereby fixing the flange of the first member to the seat of the second member.

2. A component assembly as in claim 1 wherein the recess and the slot extend through the second member.

3. A component assembly as in claim 1 wherein the second member includes at least one hardened surface for wearing engagement with a cooperating component.

4. A component assembly as in claim 1 including at least one lip beside the slot and holding the insert within the recess.

5. A component assembly as in claim 2 wherein the insert includes a head at one end and engaging the second member at one end of the recess.

6. A component assembly as in claim 1 wherein the fastener is threaded and the fastener engaging opening in the insert is a threaded opening.

7. A component assembly as in claim 1 wherein the assembly includes an annular mounting portion for mounting the assembly for relative rotational motion on a shaft.

8. A component assembly as in claim 7 wherein the first and second members each comprise semi-circular parts of the annular mounting portion, the first member having a second flange and the second member having a second seat, slot and recess receiving a second insert with a second fastener securing the second flange to the second seat, the flanges being at opposite ends of the semi-circular first member and the seats, slots, recesses and inserts being at opposite ends of the semi-circular second member and joined to the flanges by the fasteners.

9. A component assembly as in claim 8 wherein the second member defines a cam surface of an oscillating cam.

10. A component assembly as in claim 8 wherein the second member defines a wear resistant surface of a control lever assembly.

* * * * *